(12) United States Patent
Campbell et al.

(10) Patent No.: US 11,603,921 B2
(45) Date of Patent: Mar. 14, 2023

(54) PLANETARY GEAR MECHANISM FOR A GAS TURBINE ENGINE

(71) Applicant: ROLLS-ROYCE DEUTSCHLAND LTD & CO KG, Blankenfelde-Mahlow (DE)

(72) Inventors: Christopher Campbell, Berlin (DE); Silvio Eis, Rangsdorf (DE); Andreas Goumas, Matosinhos (PT)

(73) Assignee: ROLLS-ROYCE DEUTSCHLAND LTD & CO KG, Blankenfel de-Mahlow (DE)

( * ) Notice: Subject to any disclaimer, the term of this patent is extended or adjusted under 35 U.S.C. 154(b) by 0 days.

(21) Appl. No.: 17/720,958

(22) Filed: Apr. 14, 2022

(65) Prior Publication Data

US 2022/0333679 A1    Oct. 20, 2022

(30) Foreign Application Priority Data

Apr. 16, 2021   (DE) .................... 10 2021 109 637.5

(51) Int. Cl.
*F16H 57/04*   (2010.01)
*F02C 7/06*   (2006.01)
*F02C 7/36*   (2006.01)

(52) U.S. Cl.
CPC .......... *F16H 57/0479* (2013.01); *F02C 7/06* (2013.01); *F02C 7/36* (2013.01); *F16H 57/0471* (2013.01);
(Continued)

(58) Field of Classification Search
CPC .... F16H 57/0479; F16H 57/0471; F02C 7/06; F02C 7/36; F05D 2240/53; F05D 2260/37; F05D 2260/40311; F05D 2260/98
(Continued)

(56) References Cited

U.S. PATENT DOCUMENTS 4,856,377 A    8/1989 Goudreau et al.
10,066,734 B2 *  9/2018 Sheridan ................. F01D 25/18
(Continued)

FOREIGN PATENT DOCUMENTS

DE       69203908 T2    4/1996
DE       60316320 T2    6/2008
(Continued)

OTHER PUBLICATIONS

Germanl Search Report dated Dec. 8, 2021 from counterpart German Patent Application No. 10 2021 109 637.5.

*Primary Examiner* — Colby M Hansen
(74) *Attorney, Agent, or Firm* — Shuttleworth & Ingersoll, PLC; Timothy J. Klima

(57) ABSTRACT

A planetary gear mechanism for a gas turbine engine includes a planet carrier and a planet pin rotationally fixedly connected thereto and on which a planet gear is rotatably mounted via a planet bearing. The planet pin is at least approximately hollow cylindrical in regions. A sleeve in the planet pin comprises an oil feed region through which the bearing is supplied with oil. An outer side region of the sleeve and an inner side region of the planet pin are press fit together. The sleeve has a web radially inside the outer side region. The web extends radially through the sleeve and is fixedly connected to the outer side region in an end region of a main load zone of the bearing, and at the other end is fixedly connected to the outer side region on the opposite side thereof in the radial direction of the sleeve.

12 Claims, 18 Drawing Sheets

(52) U.S. Cl.
CPC ...... *F05D 2240/53* (2013.01); *F05D 2260/37* (2013.01); *F05D 2260/40311* (2013.01); *F05D 2260/98* (2013.01)

(58) Field of Classification Search
USPC .......................................................... 475/159
See application file for complete search history.

(56) References Cited

U.S. PATENT DOCUMENTS

| | | |
|---|---|---|
| 2008/0098712 A1 | 5/2008 | Sheridan |
| 2015/0252889 A1 | 9/2015 | Feraud |
| 2015/0323057 A1* | 11/2015 | Kim .................... F16H 57/0482 475/159 |
| 2019/0234509 A1 | 8/2019 | Desjardins et al. |

FOREIGN PATENT DOCUMENTS

| | | |
|---|---|---|
| EP | 3489549 A1 | 5/2019 |
| EP | 3489550 A1 | 5/2019 |
| EP | 3770466 A1 | 1/2021 |
| WO | 2021058893 A1 | 4/2021 |

\* cited by examiner

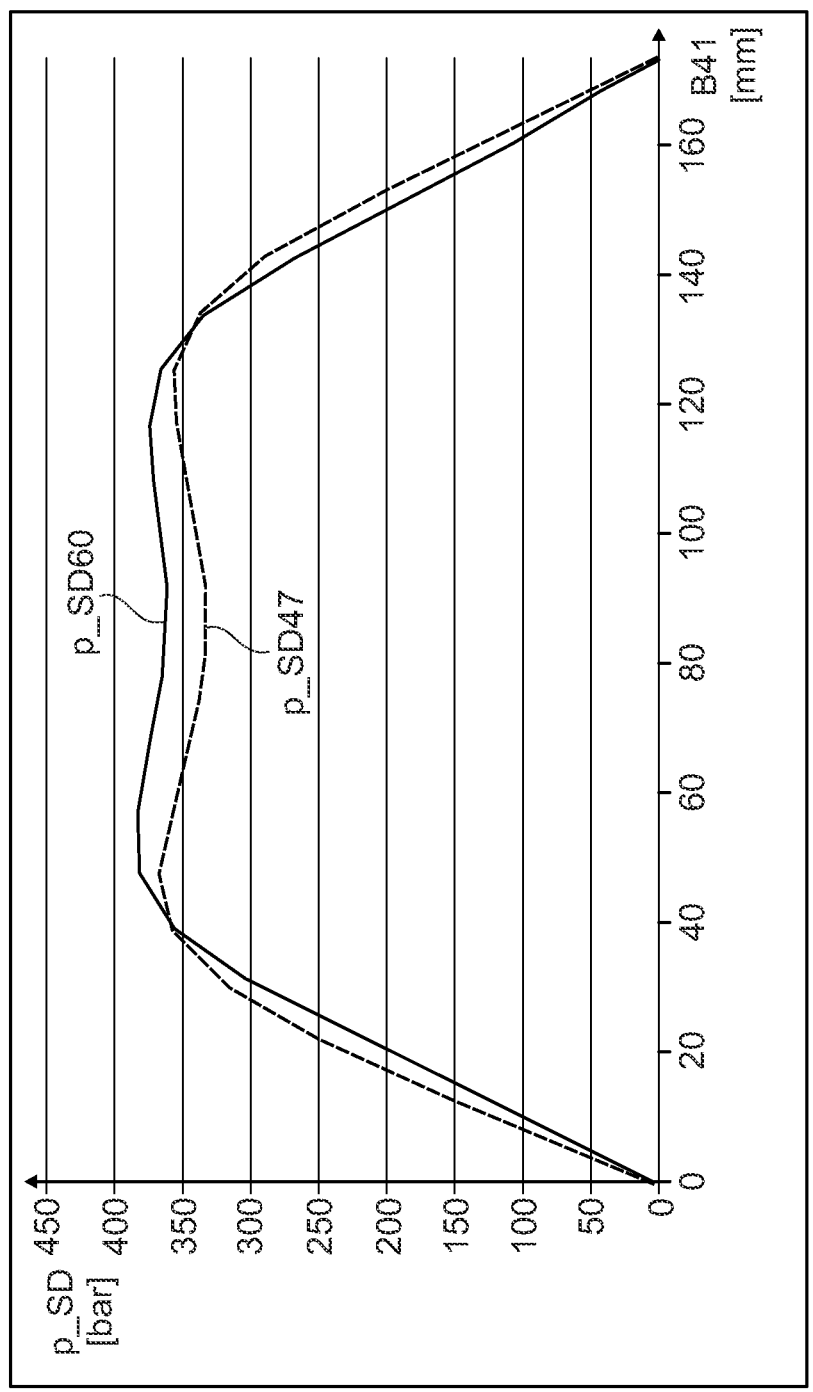

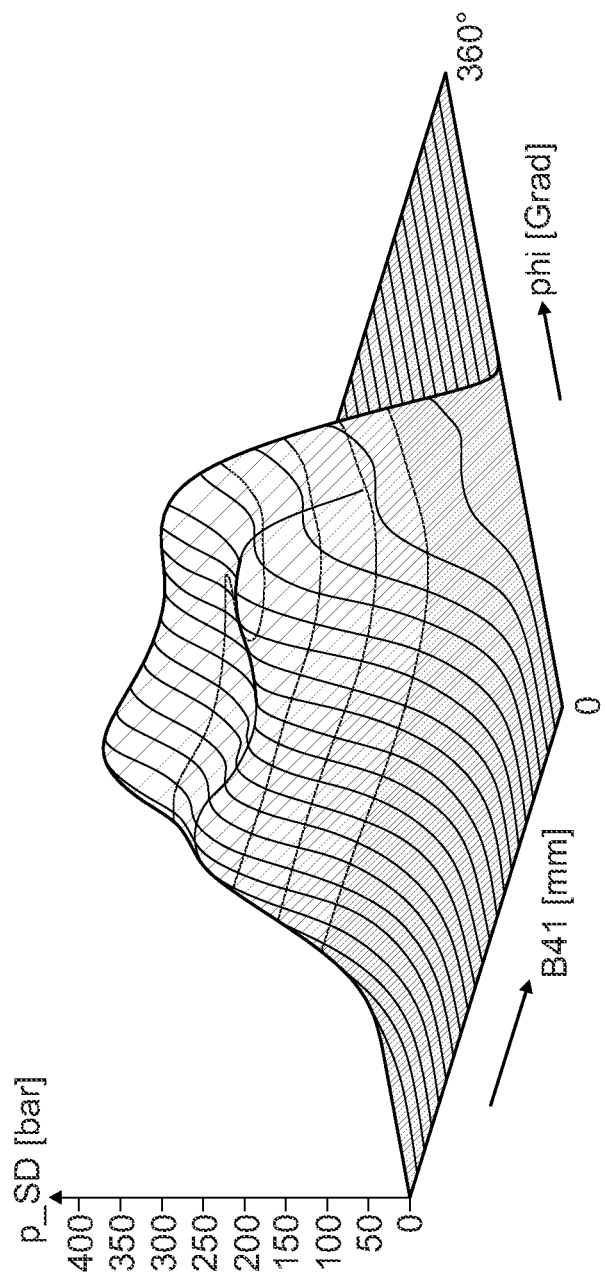

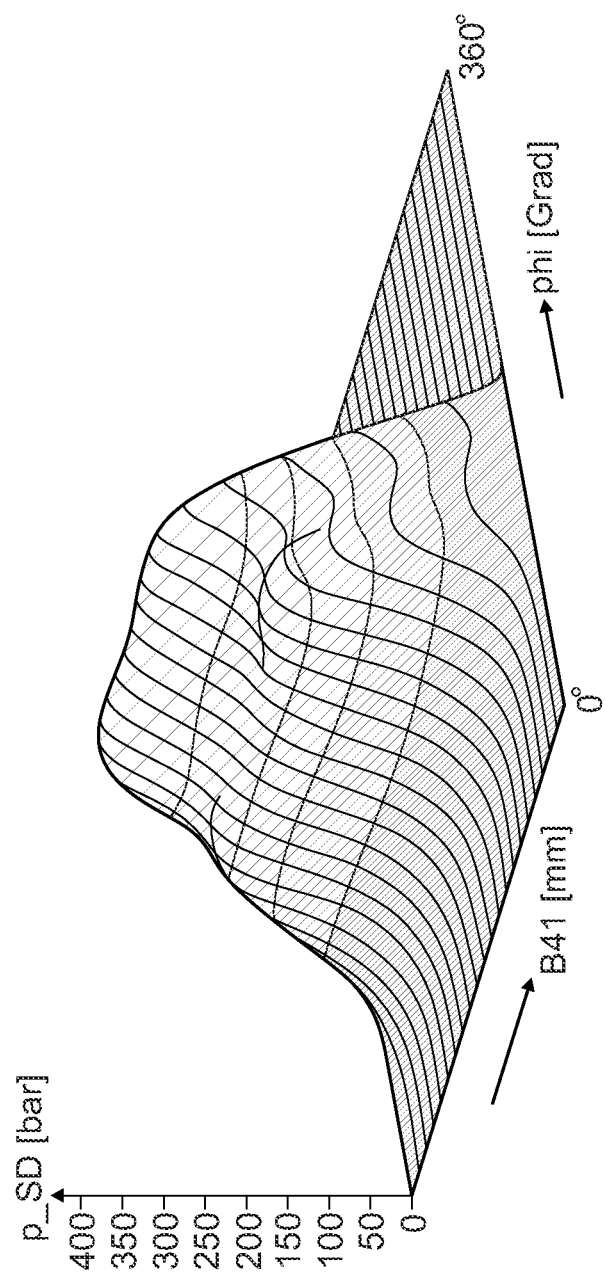

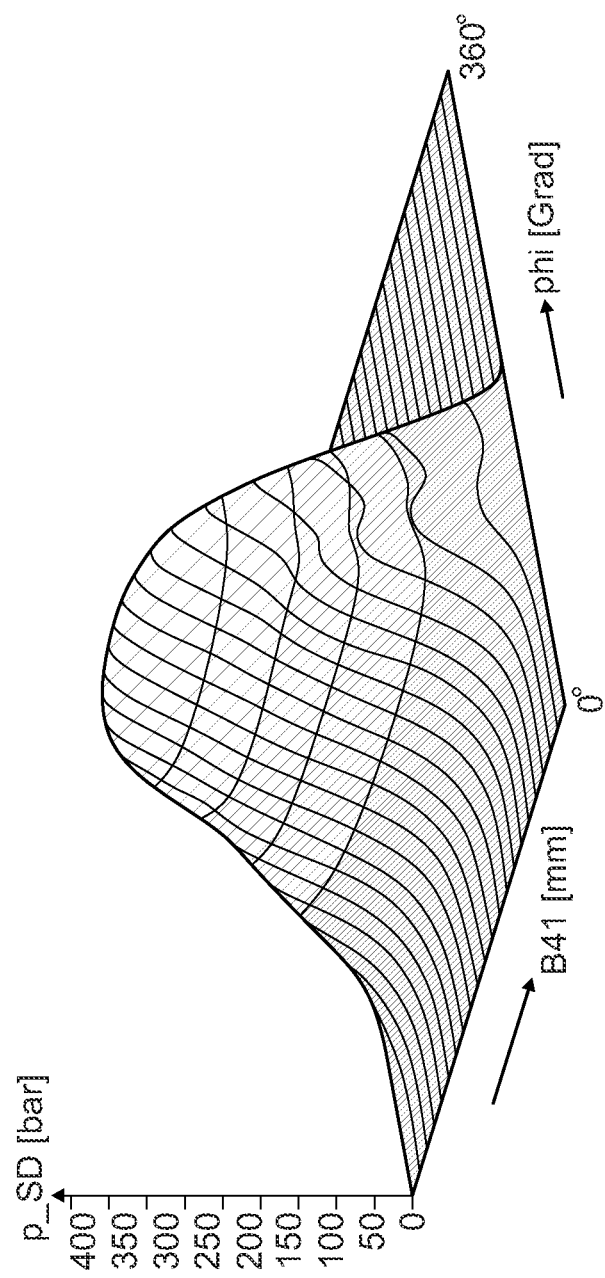

PLANETARY GEAR MECHANISM FOR A GAS TURBINE ENGINE

This application claims priority to German Patent Application DE102021109637.5 filed Apr. 16, 2021, the entirety of which is incorporated by reference herein.

The present disclosure concerns a planetary gear mechanism for a gas turbine engine, with a planet carrier and at least one planet pin which is rotationally fixedly connected thereto and on which at least one planet gear is rotatably mounted via a plain bearing.

Apart from rolling bearings, plain bearings are the most frequently used type of bearing in the construction of machinery and equipment. Here, the two parts that move relative to one another in the plain bearing are in direct contact. They slide on one another against the resistance caused by sliding friction. This can be kept low by selecting a low-friction pair of materials, by lubrication or by the production of a lubricating film which separates the two contact surfaces. If the two parts come into contact, which is the case with most plain bearings that are used, wear occurs on the contact surfaces, limiting the service life of a plain bearing. In the case of fluid lubrication, the production of the separating lubricating film requires additional expenditure. The sliding resistance has the effect that some of the kinetic energy is converted into heat energy, which flows into the two bearing parts and may have to be dissipated.

Plain bearings are differentiated inter alia according to sliding resistance. In this context, a distinction is drawn between simple plain bearings, hydrodynamic plain bearings and hydrostatic plain bearings. Simple plain bearings are either unlubricated or lubricated by means of a lubricant, such as grease. Depending on the design of a plain bearing, the sliding resistance results from what is known as solid body friction, mixed friction or viscous friction.

In the case of plain bearings with solid body friction, which is often also referred to as dry friction, low-friction pairs of materials are used. Sometimes, one of the two partners has what is known as a self-lubricating property. The second partner is generally produced from steel.

In turbines and generators, use is often made of plain bearings between whose partners the sliding resistance results from viscous friction. The desired lubricating film in the bearing gap must be put under pressure to ensure that the contact surfaces can be separated from one another counter to the bearing force. In the case of hydrostatic plain bearings, an oil pump is used for this purpose. In contrast, the oil pressure in the lubricating film in the case of "hydrodynamic" plain bearings is produced by the contact surfaces themselves as they move relative to one another.

With planetary gear mechanisms of gas turbine engines of aircraft as known from the prior art, sleeves are arranged in the inside of planet pins, which are hollow at least in regions, wherein said sleeves together with the planet pin delimit oil feed regions through which oil is conducted into an oil feed pocket of a plain bearing between a planet pin and a planet gear.

In gear mechanisms which are used in gas turbine engines of aircraft, because of the limited oil quantity available and the partially high operating temperatures, particular requirements are imposed on the plain bearing. In addition, a total weight of a gas turbine engine should be as low as possible. However, this requirement demands that a rigidity of the design is characterized by a lower rigidity in comparison with conventional applications, such as stationary industrial applications.

It is known that planetary gear mechanisms of gas turbine engines of aircraft are exposed to high centrifugal forces and torque levels in operation. The centrifugal forces and torque levels deform the planet pins and planet gears, influencing a lubricant film in the plain bearings, which can reduce the functionality of a plain bearing. In particular, a corresponding stiffness of the planet pin contributes to evening out the bearing gap height and hence the lubricant film in the axial extent direction of the plain bearing. The resulting necessary component dimensions of planet pins lead to a high overall weight of planetary gear mechanisms, which is undesirable in aviation applications.

EP 3 489 549 A1 discloses a planetary gear mechanism of a gas turbine engine of an aircraft in which a planet plain bearing pin or planet pin is configured with an axial bore. Such planet pins firstly have a low component weight and secondly can be mounted more easily in bores of planet carrier regions. In order to design the planet pins with a desired high stiffness, it is proposed that the contact faces of the planet pins for the planet gears are designed in crowned form. The crowned contact faces of the planet pins here form respective contact faces of plain bearings between the planet pins and the planet gears.

In addition, it is proposed that the inner diameter of the axial bores of the planet pins varies in the axial direction, and also the outer sides of the planet pins are crowned. The aim here is to achieve a low-weight design of the planet pins with a simultaneous reduction in bearing load. Planet pins designed in this way can easily be deformed in the region of their axial ends during operation. This means that under load, the planet pins follow the contours of the planet gears more closely, and a more even plain bearing gap with parallel oriented contact faces results over the axial length of the plain bearing.

A similar procedure for improving the load-bearing capacity and service life of plain bearings is described in EP 3 489 550 A1. The contact faces of the planet pins are also crowned. The outer diameters of the planet pins decrease from a maximum outer diameter towards at least one axial end of the contact face, reaching a minimum at the respective axial ends of the planet pins. It is furthermore proposed that the planet pins, which are usually designed hollow with an axial opening or bore, may in principle have inner faces of arbitrary design. For example, the planet pins may be hollow cylindrical on the inside, i.e. have an axial opening of constant diameter. In further embodiments, the inner diameters of the planet pins vary along their axial extent.

Planet pins of gas turbine engines of aircraft, in which the inner diameter of the axial bores varies in the axial direction, are also known from EP 3 770 466 A1. The various embodiments of the planet pins are intended to improve a bearing gap height of plain bearings between the planet pins and the planet gears of planetary gear mechanisms, such that the plain bearings have a longer service life.

The solutions outlined above all lead to high production complexity and are characterized by high manufacturing costs, because it is not possible to use the same parts for different load requirements since specially designed planet pins must be used for each different load case.

In addition, the choice of materials which can be used for the production of the planet pins leads to a conflict of objectives. Firstly, the respective material used must be able to ensure a sufficient fatigue strength of the plain bearing, and secondly the material must also allow a sufficiently high stiffness of a planet pin with simultaneously minimum component weight. However, materials with which a high component stiffness can be achieved, with simultaneously low component weight, often do not have the material properties necessary for use in the region of plain bearings. Since both the fatigue strength of plain bearings and the stiffness of planet pins are important parameters for the service life of plain bearings, planet pins which are hollow at least in regions also have correspondingly large wall thicknesses, and as a result also a high component weight, in order to achieve the necessary strength of the planet pins.

The present disclosure is based on the object of providing a planetary gear mechanism which is characterized by a low component weight, and in which the plain bearings between the planet gears and planet pins have a long service life.

This object is achieved by a planetary gear mechanism having the features of claim 1. Advantageous developments form the subject matter of the dependent claims and of the following description.

A planetary gear mechanism for a gas turbine engine is proposed with a planet carrier and at least one planet pin connected rotationally fixedly thereto. At least one planet gear is rotatably mounted on the planet pin via a plain bearing. The planet carrier is designed to be at least approximately hollow cylindrical at least in regions. A sleeve comprising an oil feed region, through which the plain bearing is supplied with oil, is provided in the planet pin. An outer side region of the sleeve and an inner side region of the planet pin are connected together via a press fit. The sleeve has at least one web which lies radially inside the outer side region and extends radially through the sleeve. The web is fixedly connected at one end to the outer side region, in the region of a main load zone of the plain bearing, and at the other end is fixedly connected to the outer side region on the opposite side thereof in the radial direction of the sleeve.

The web of the sleeve, provided radially in the interior the planet pin, increases a radial stiffness of the planet pin. The increase in radial stiffness of the planet pin helps counter the loads to which the planet pin is exposed during operation of the planetary gear mechanism. The increase in the radial stiffness of the planet pin has a positive effect on the thickness of the lubricant film in the region of the bearing gap of the plain bearing. Furthermore, the increase in radial stiffness of the planet pin also has a positive effect on the pressure distribution of the plain bearing, which increases the robustness and load-bearing capacity of the plain bearing. In addition, use of the sleeve as a stiffening element, in comparison with the known solutions, leads to a reduction in the component weight of the planetary gear mechanism as a whole.

Furthermore, the planet pins can be produced with lower production cost and allow a more extensive use of identical parts, since the radial stiffness of the planet pins can be adapted to the respective application in a structurally simple fashion by the use of stiffening sleeves of different design arranged in the interior, without the need to make structural changes to the planet pin itself. In comparison with known solutions, a planetary gear mechanism according to the present disclosure leads to lower costs for stockholding, development and production, with simultaneously higher component quality.

In addition, the radial stiffness of the planet pin is selected at least partially independently of the material from which the planet pin is made, and depending on the material properties necessary for the function of the plain bearing. This is because the sleeve can be made from a substantially stiffer material than the planet pin, since the material for the sleeve can be selected irrespective of the plain bearing properties to be provided.

Here, the present disclosure is in principle based on the knowledge that the main load zone of a plain bearing, depending on the respective application case, can be found in different peripheral regions in the circumferential direction of a plain bearing.

With a rotationally fixed design of the planet carrier, a main load direction of the plain bearing, in the rotational direction of the planet gear, encloses an angle of around 90° with a radial direction of the planet carrier. This is because no centrifugal forces act on the planet pin and on a planet gear rotatably mounted thereon via the plain bearing, and the bearing load results substantially only from the torque to be transmitted. The web of the sleeve may then be arranged in a peripheral region of the plain bearing which encloses angular values in a range from 60 degrees to 120 degrees, preferably from 85 degrees to 95 degrees, with the radial direction of the planet carrier in the rotational direction of the planet gear.

Moreover, it is also possible that the planet carrier of the planetary gear mechanism according to the present disclosure is rotatable. A main load direction of the plain bearing, in the rotational direction of the planet gear opposite the planet pin, may then enclose angular values between 110 degrees and 180 degrees with a radial direction of the planet carrier, depending on operating point. This again is because a resulting bearing force of the plain bearing is composed of a first bearing force component and a second bearing force component. The first bearing force component results from the torque applied to the planetary gear mechanism. The further or second bearing force component results from the centrifugal force which acts on the planet gear and on the planet pin during operation of the planetary gear mechanism with a rotating planet carrier.

The first bearing force component, in the rotational direction of the planet gear, encloses an angle equal to 90 degrees with the radial extent direction of the planet carrier which runs through the centre point of the planet pin. The second bearing force component, in the rotational direction of the planet gear, encloses an angle equal to 180 degrees with the radial extent direction of the planet carrier. Thus the angular value which the main load direction encloses with the radial direction of the planet carrier, when the planet carrier is designed to be rotatable, lies in the above-mentioned angular range from 110 degrees to 180 degrees, depending on operating state.

Preferably, the course of the web encloses angular values in the range from 160 to 200 degrees, preferably 170 to 190 degrees, with the radial extent direction of the planet carrier.

A wall thickness of the web may be constant in a middle region, which gives a desired high buckling resistance of the web.

The wall thickness of the web may rise constantly between the middle region and the ends of the web, which are each connected to the outer side region of the sleeve, starting from the middle region in the direction of the outer side region. This leads to transitions which are as harmonious as possible between the middle region of the web and the outer side region of the sleeve, avoiding or limiting to acceptable values any undesired notch effects and the resulting stress peaks in the connecting region between the ends of the web and the outer side region of the sleeve.

In a further embodiment of the planetary gear mechanism according to the present disclosure, a width of the web is constant in the axial extent direction of the planet pin and the sleeve. Such an embodiment of the planetary gear mechanism is characterized by low production complexity.

An outer side of the sleeve and an inner side of the planet pin may delimit a cavity which is fluidically connected to the oil feed region of the sleeve and to an oil feed pocket of the plain bearing. Then oil can be guided through the sleeve and the planet pin to the plain bearing in a structurally simple fashion.

In addition, the planet pin may comprise at least one bore which lies radially on the inside relative to the oil feed pocket, and via which oil can be conducted radially through the planet pin into the oil feed region of the sleeve.

The planet pin may comprise at least one radial bore which lies radially on the inside relative to the oil feed pocket, and via which oil can be conducted from the cavity radially through the planet pin into the oil feed pocket of the plain bearing.

If the web is provided radially inside the oil feed pocket in the axial direction of the planet pin, the reduced bending strength of the planet pin, which results from the arrangement of the oil feed pocket, can be compensated in a structurally simple fashion.

The planet pin may have at least two radial bores which are arranged next to one another in the axial extent direction of the planet pin and are spaced apart from one another. The web may be here also be positioned between the two radial bores in the axial direction, in order to be able to provide, to the necessary extent, a desired development of the bending resistance of the planet pin in the axial extent direction.

In a further embodiment of the planetary gear mechanism according to the present disclosure, the sleeve has at least two webs which are arranged next to one another in the axial extent of the sleeve and spaced apart from one another. The oil feed region of the sleeve may be provided between the two webs in the axial direction, in order to be able to set, to the desired extent, the development of the bending resistance of the planet pin.

If, in the region of its outside, the end of the sleeve lies on the inner side of the planet pin, undesirable relative movements between the sleeve and the planet pin can be avoided in a structurally simple fashion by a corresponding fit in the region of the ends of the sleeve.

An axial shoulder of the outer side of the sleeve may lie on an axial shoulder of the inner side of the planet pin. Thus on lateral insertion of the sleeve into the interior of the planet pin, an axial adjustment travel of the sleeve relative to the planet pin may be limited in a structurally simple fashion, and the planetary gear mechanism according to the present disclosure can be installed with little complexity.

In the case of a gas turbine engine which is described and claimed herein, a combustion chamber may be provided so as to be axially downstream of the fan and the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator vanes, the latter potentially being variable stator vanes (in that the angle of incidence of said stator vanes can be variable). The row of rotor blades and the row of stator blades may be axially offset from one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset from one another.

Each fan blade may be defined as having a radial span extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade over which gas flows, that is to say the portion that is situated radially outside any platform.

The radius of the fan can be measured between the engine center line and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and claimed herein may be defined as the ratio of the stagnation pressure upstream of the fan to the stagnation pressure at the exit of the highest pressure compressor (before the entry to the combustion chamber). By way of non-limiting example, the overall pressure ratio of a gas turbine engine as described and claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of a gas turbine engine may be defined as the net thrust of the gas turbine engine divided by the total mass flow through the engine. The specific thrust of an engine as described and/or claimed herein at cruise conditions may be less than (or of the order of): 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range delimited by two of the values in the previous sentence (that is to say that the values may form upper or lower limits). Such gas turbine engines can be particularly efficient in comparison with conventional gas turbine engines.

A gas turbine engine as described and claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide vane. At cruising speed, the TET may be at least (or of the order of): 1400 K, 1450 K, 1500 K, 1550 K, 1600 K, or 1650 K. The TET at cruising speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade as described herein can be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading edge, which is manufactured using a material that is better able to resist impact (for example of birds, ice, or other material) than the rest of the blade. Such a leading edge may, for example, be manufactured using titanium or a titanium-based alloy. Thus, purely by way of example, the fan blade may have a carbon-fiber-based or aluminum-based body (such as an aluminum-lithium alloy) with a titanium leading edge.

A fan as described herein may comprise a central portion from which the fan blades can extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least some of the fan blades can be machined from a block and/or at least some of the fan blades can be attached to the hub/disk by welding, such as linear friction welding, for example.

The gas turbine engines as described and claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine engine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or the gas turbine engine at the midpoint (in terms of time and/or distance) between end of climb and start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example in the magnitude of Mach 0.8, in the magnitude of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine as described and claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are furthermore possibilities of combining individual features, including those which emerge from the claims, the following description of embodiments and directly from the drawing. Reference to the drawings by the claims through the use of reference signs is not intended to restrict the scope of protection of the claims.

Preferred refinements are derived from the dependent claims and the description hereunder. Exemplary embodiments of the subject matter according to the present invention are explained in greater detail with reference to the drawing, without being restricted thereto. In the drawing:

Figure 5:
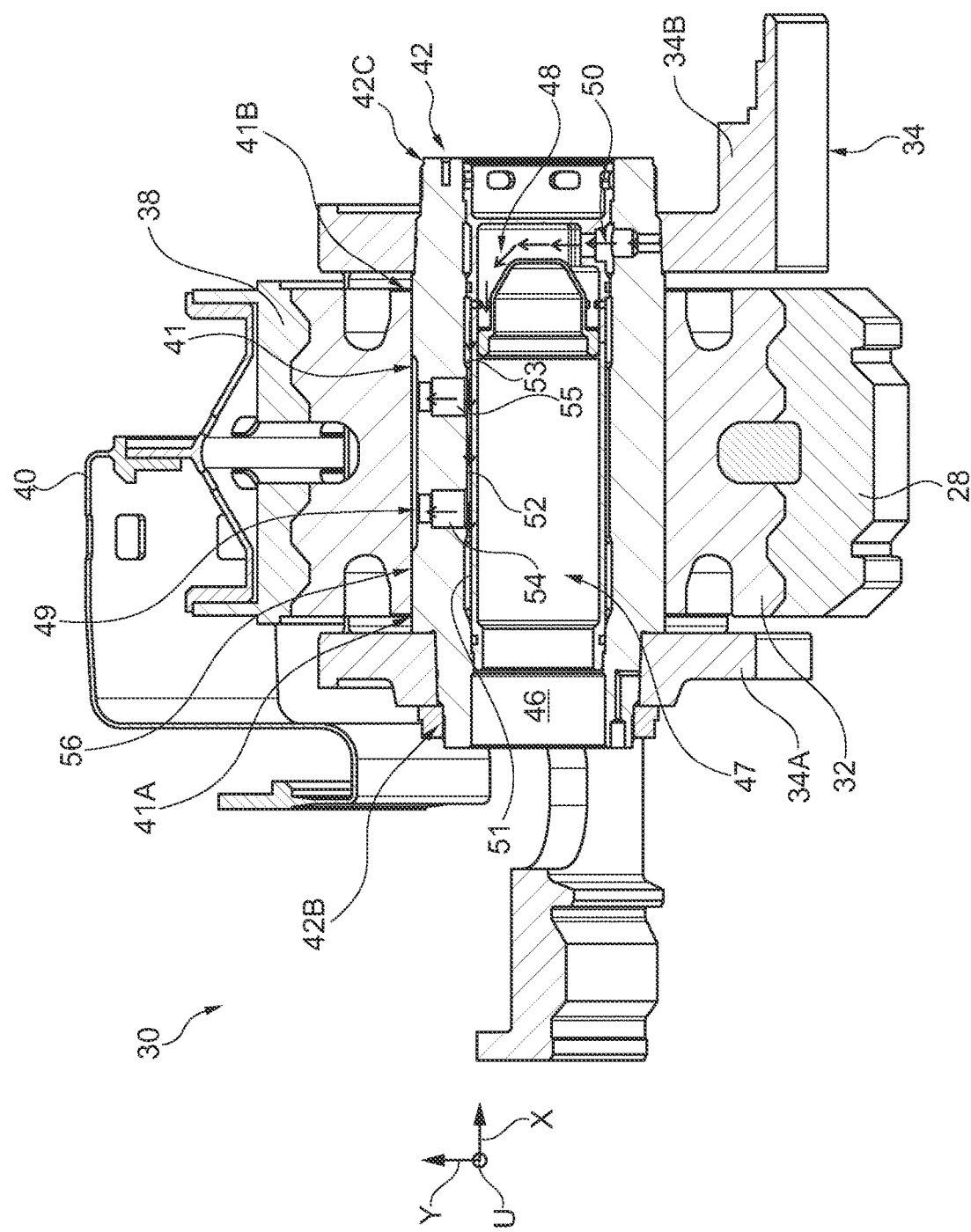
FIG. 5 shows a schematic, longitudinal sectional view of a known planetary gear mechanism.
Figure 10:
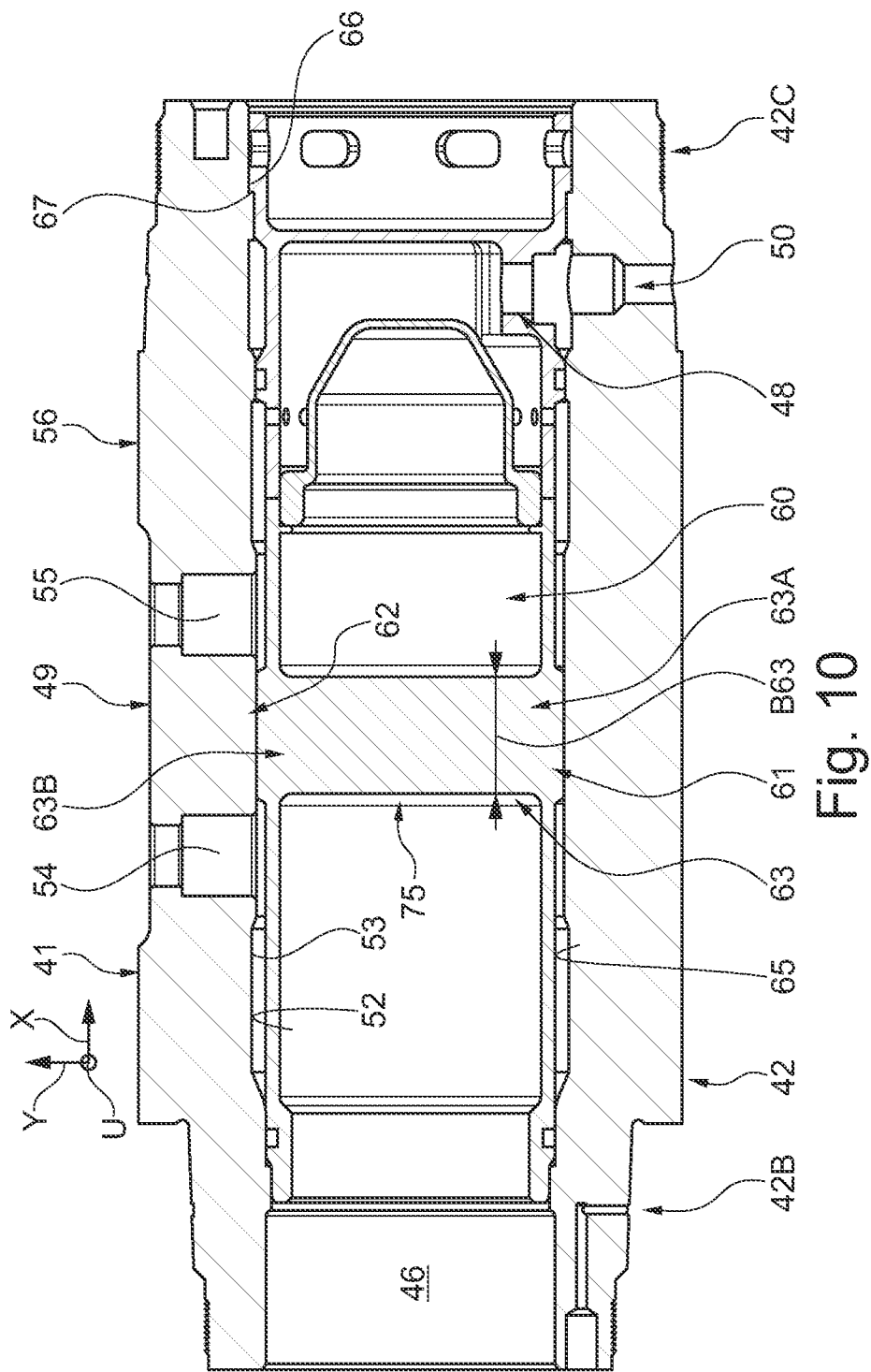
FIG. 10 shows a sectional view of a planet pin and sleeve arranged therein, in an embodiment of a planetary gear mechanism according to the present disclosure.
Figure 14:
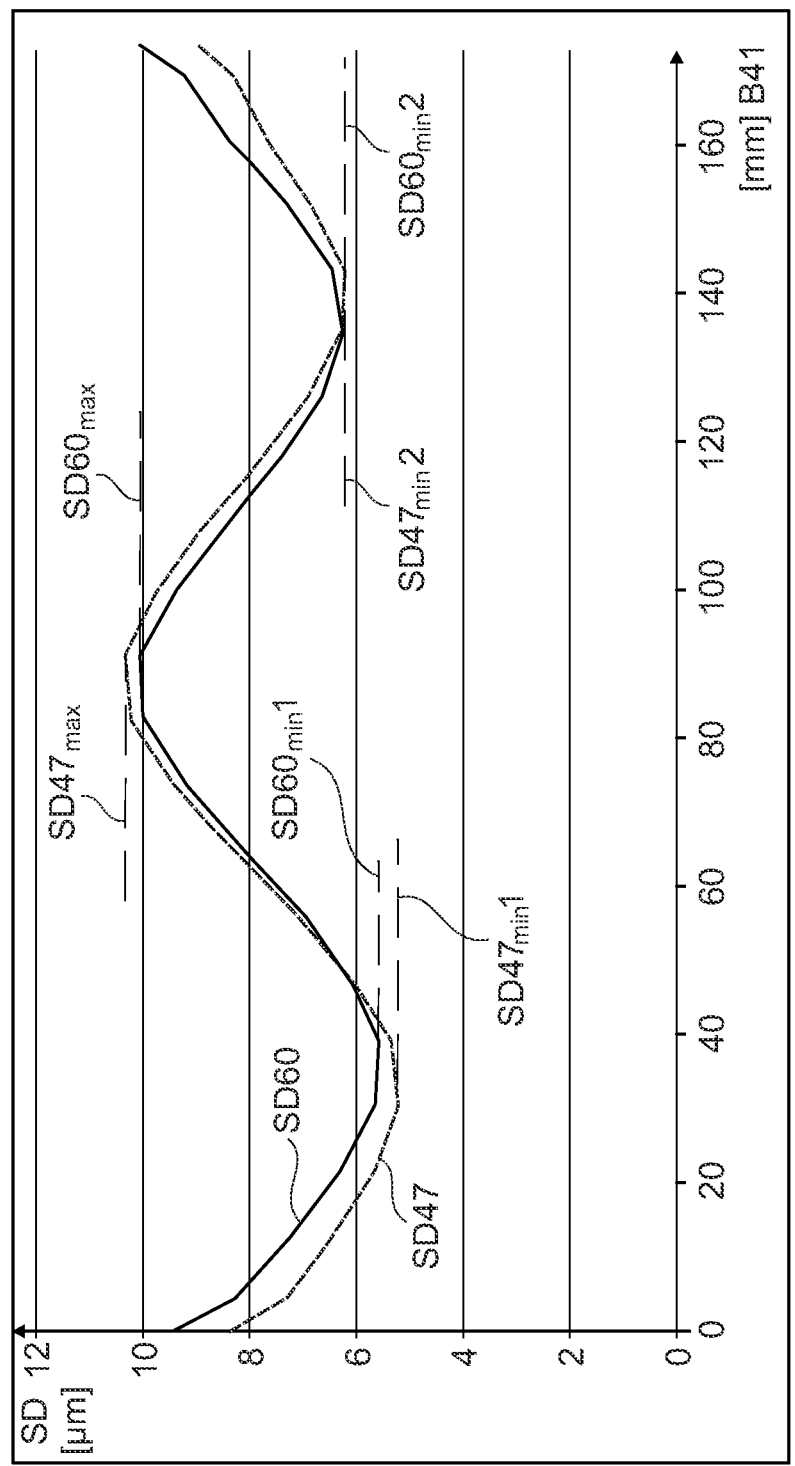
Figure 17:
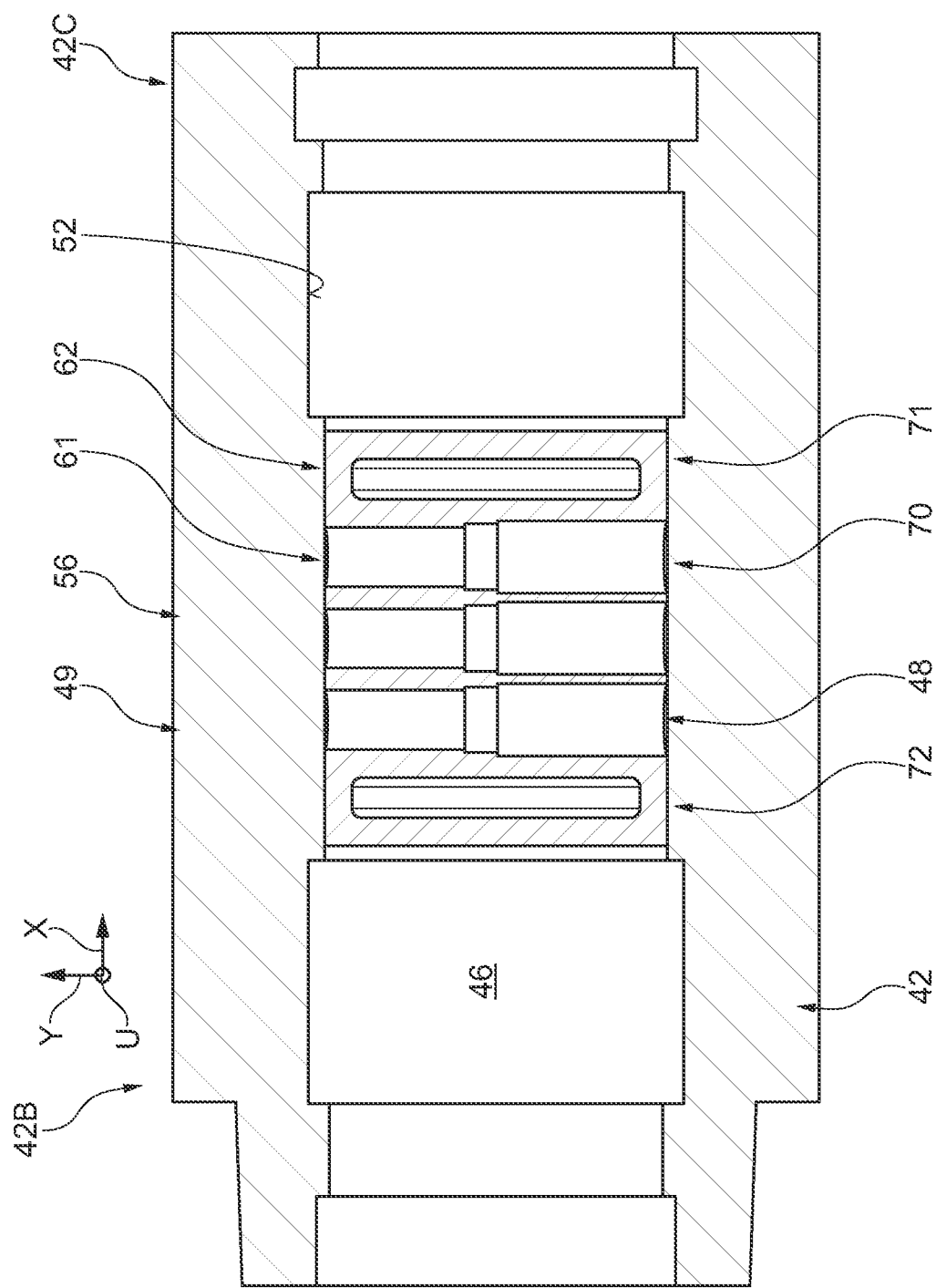

FIG. 14 shows a curve of a lubricant film thickness over the axial width of the plain bearing of the planetary gear mechanism from FIG. 5, in a circumferential range of approximately 192 degrees, and a curve of the lubricant film thickness of the plain bearing between the planet pin with the sleeve from FIG. 10 and the planet gear, in a circumferential range of around 190 degrees of the plain bearing;

FIG. 15 shows a comparison of curves of an oil pressure in the lubricant film of the plain bearing of the planetary gear mechanism from FIG. 5, and an oil pressure in the lubricant film of the plain bearing which comprises the planet pin and sleeve from FIG. 10, over the axial bearing width of the plain bearing;

FIG. 16a shows a three-dimensional map of a conventionally designed plain bearing from FIG. 5 which illustrates the oil pressure in the bearing gap of the plain bearing depending on the circumference and bearing width of the plain bearing;

FIG. 16b shows a three-dimensional map which illustrates the oil pressure in the plain bearing gap of the plain bearing, both in the circumferential direction and over the bearing width, wherein the plain bearing comprises a planet pin and a sleeve according to FIG. 10, and wherein a press fit between the sleeve and the planet pin has an oversize of 0.03 mm;

FIGS. 16c and 16b show corresponding maps of the oil pressure in the plain bearing gap of the plain bearing with the planet pin and sleeve from FIG. 10, wherein the press fit between the sleeve and the planet pin has an oversize of 0.1 mm; and FIG. 17 shows a longitudinal sectional view of a further embodiment of the planetary gear mechanism according to the present disclosure, wherein the longitudinal sectional view shows a planet pin and sleeve pressed therein.

Figure 1:
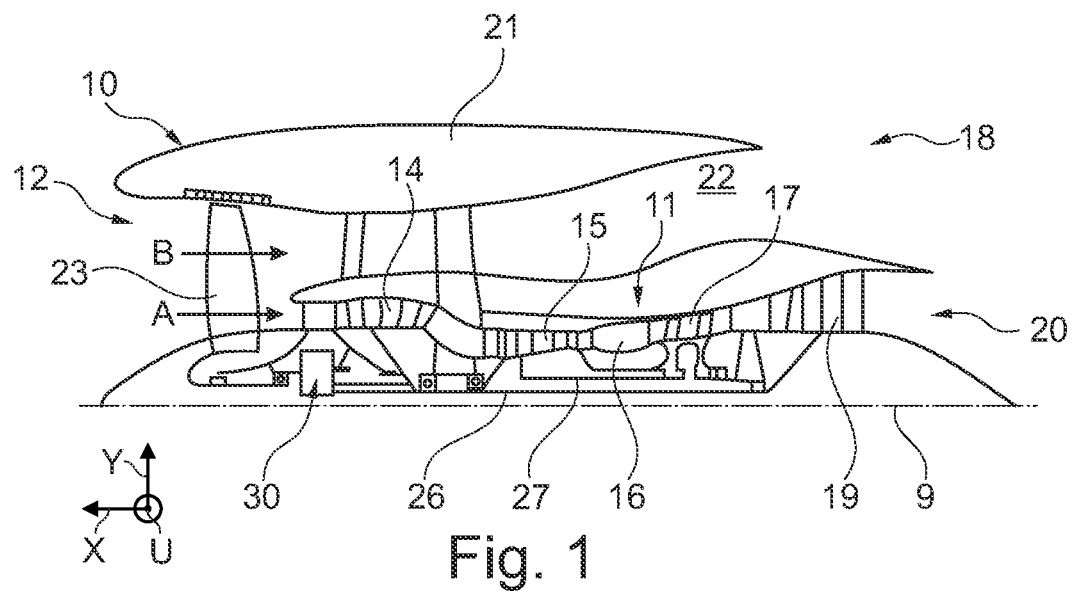
FIG. 1 shows a schematic longitudinal sectional view of a gas turbine engine.

FIG. 1 illustrates a gas turbine engine 10 with a main axis of rotation 9. The engine 10 comprises an air intake 12 and a thrust fan 23 that generates two airflows: a core airflow A and a bypass airflow B. The gas turbine engine 10 comprises a core 11 that receives the core airflow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear mechanism 30. The shaft 26 herein is also referred to as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27, which is also referred to as the core shaft. The fan 23 generally provides the majority of the propulsion force. The epicyclic gear mechanism 30 is a reduction gear mechanism.

Figure 2:
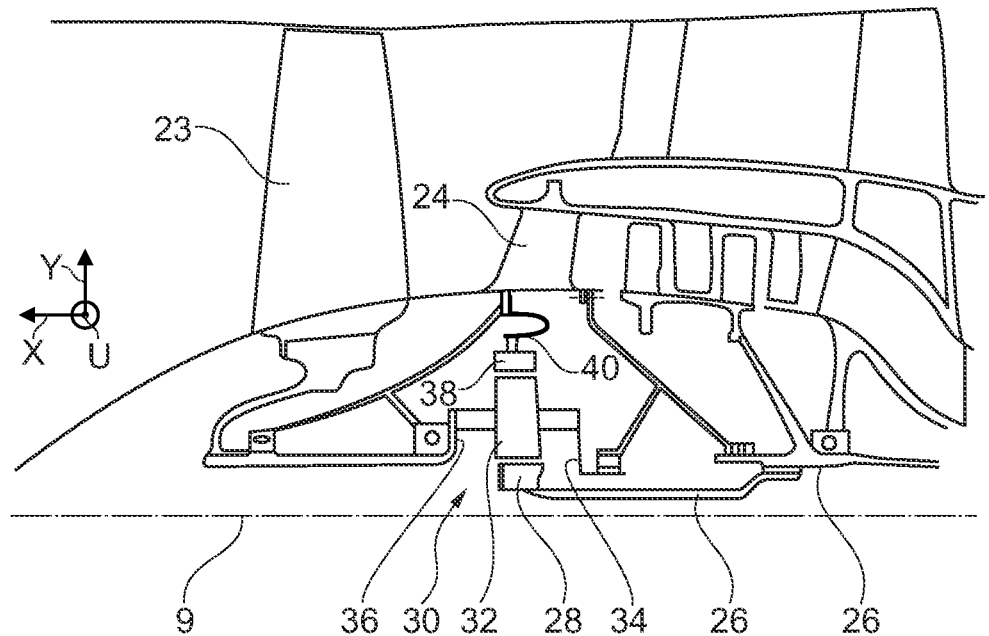
FIG. 2 shows an enlarged, partial, longitudinal sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear arrangement 30. Multiple planet gears 32, which are coupled to one another by means of a planet carrier 34, are situated radially outside the sun gear 28 and mesh with the latter, and are in each case arranged so as to be rotatable on carrier elements or planet pins 42 which are connected in a rotationally fixed manner to the planet carrier 34 and are shown in detail in FIG. 3. The planet carrier 34 limits the planet gears 32 to orbiting around the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the transmission output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Figure 3:
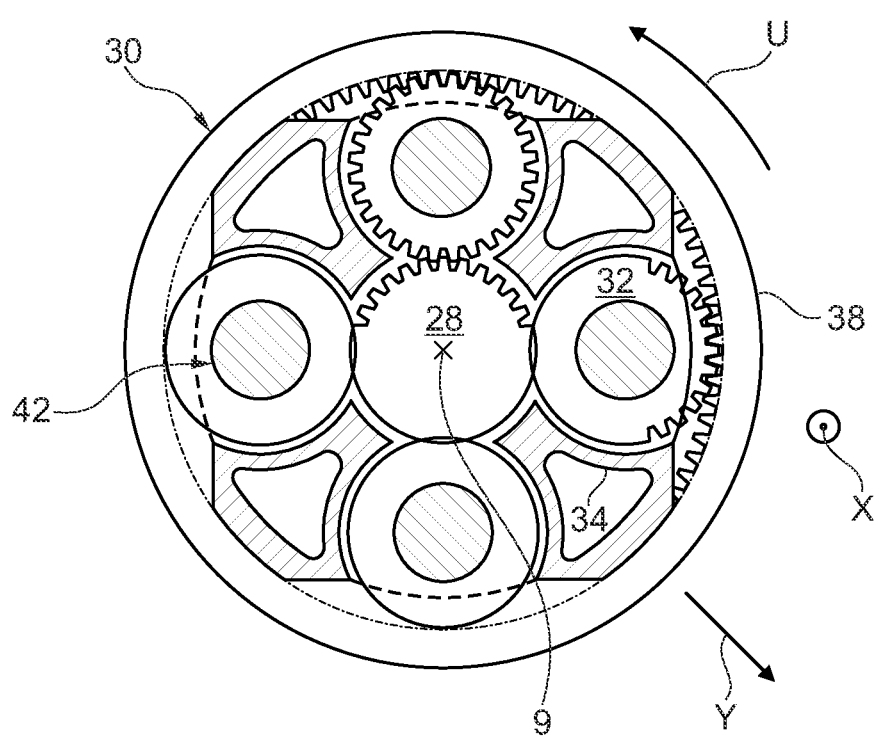
FIG. 3 shows an isolated illustration of a gear mechanism for a gas turbine engine.

The epicyclic gear mechanism 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear mechanism 30 generally comprise at least three planet gears 32.

The epicyclic gear mechanism 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic gear mechanism 30 may be used. As a further example, the epicyclic gear mechanism 30 may be a star arrangement, in which the planet carrier 34 is held fixed, with the ring gear (or annulus) 38 allowed to rotate. In the case of such an arrangement, the fan 23 is driven by the ring gear 38. As a further alternative example, the gear mechanism 30 can be a differential gear in which both the ring gear 38 and the planet carrier 34 are allowed to rotate.

It will be appreciated that the arrangement shown in FIGS. 2 and 3 is merely exemplary, and various alternatives fall within the scope of protection of the present disclosure. Purely as an example, any suitable arrangement may be used for positioning the gear mechanism 30 in the engine 10, and/or for connecting the gear mechanism 30 to the engine 10. By way of a further example, the connections (such as the linkages 36, 40 in the example of FIG. 2) between the gear mechanism 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear mechanism and the fixed structures, such as the gear casing) may be used, and the disclosure is not limited to the exemplary arrangement of FIG. 2. For example, where the gear mechanism 30 has a star arrangement (described above), the person skilled in the art would readily understand that the arrangement of output and support linkages and bearing positions would usually be different from those shown by way of example in FIG. 2.

Accordingly, the present disclosure extends to a gas turbine engine having an arbitrary arrangement of transmission types (for example star-shaped or planetary), support structures, input and output shaft arrangement, and bearing positions.

Optionally, the gear mechanism may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of further example, the gas turbine engine shown in FIG. 1 has a split flow nozzle 20, 22, meaning that the flow through the bypass duct 22 has a dedicated nozzle that is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

Figure 4:
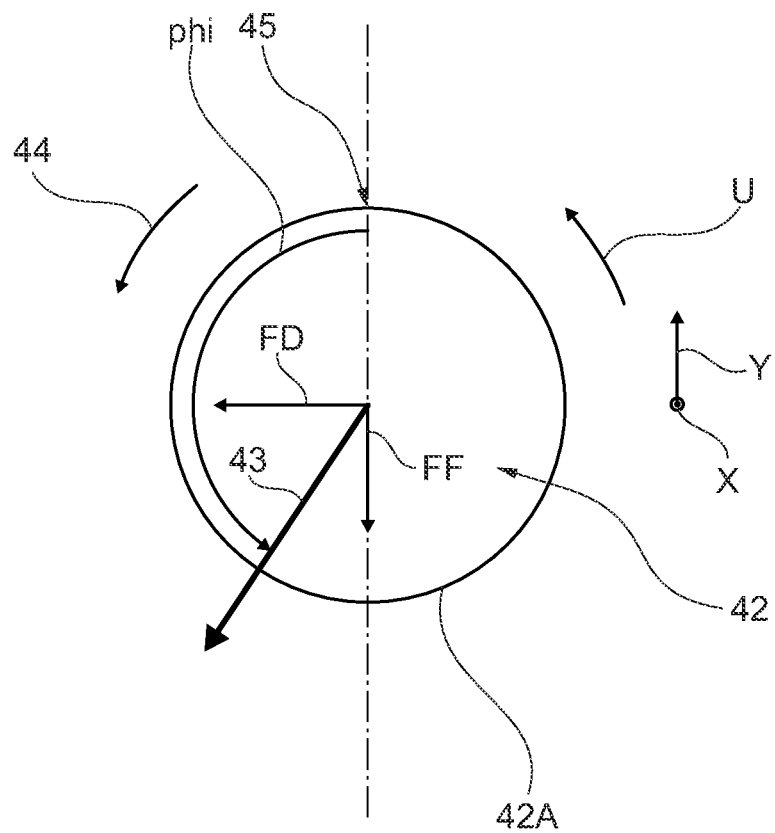
FIG. 4 shows a highly schematized isolated illustration of a planet pin of the planetary gear mechanism according to FIG. 3, on which a planet gear is rotatably mounted.

FIG. 4 shows the planet pin 42 alone, in a highly schematic side view. A circle line 42A shown in FIG. 4 corresponds to the diameter of the planet pin 42. An arrow 43 indicates the main load direction of the plain bearing 41 between the planet gear 32 and the planet pin 42.

The main load direction 43 corresponds to the direction of the resultant bearing force of the plain bearing 41, which is composed of the bearing force component FD and the further bearing force component FF. The bearing force component FD in each case results from the respective torque applied to the planetary gear mechanism 30. The further bearing force component FF results from the centrifugal force which acts on the planet gear 32 during operation of the planetary gear mechanism 30 with a rotating planet carrier 34.

If the planet carrier 34 is of non-rotatable design, the main load direction 43 of the plain bearing 41 corresponds substantially to the direction of bearing force component FD since there is then no centrifugal force acting on the planet gear 32. In addition, the direction of rotation of the planet gear 32 is indicated in FIG. 4 by the reference sign 44.

The bearing force component FD, in the rotational direction 44 of the planet gear 42, encloses an angle phi equal to 90 degrees with the radial extent direction of the planet carrier 34, which in FIG. 4 corresponds to the radial direction Y and runs through the middle point of the planet pin 42 and the radially outer point 45. The bearing force component FF, in the rotational direction 44 of the planet gear 42, encloses an angle phi equal to 180 degrees with the radial extent direction of the planet carrier 34.

If the planet carrier 34 is rotatable, the angular value of the angle phi, which is enclosed by the main load direction 43 with the radial direction Y of the planet carrier 34, varies in a range from 160 degrees to 200 degrees, depending on operating state.

FIG. 5 shows a schematic, three-dimensional, longitudinal sectional view of an embodiment of the planetary gear mechanism 30 known in itself. The planet pin 42 is designed with an axial longitudinal bore 46 in which a sleeve 47 is arranged. The sleeve 47 is designed with an oil feed region 48 in which oil can be conducted in the direction of the oil feed pocket 49 from a bore 50 in the planet pin 42 lying radially on the inside relative to an oil feed pocket 49. Downstream of the oil feed region 48, an outer side 51 of the sleeve 47 and an inner side 52 of the planet pin 42 delimit a ring gap 53 or cavity. The ring gap 53 lies on the radial inside relative to the oil feed pocket 49 and is fluidically connected to the oil feed pocket 49 via radial bores 54, 55.

In the region of the radial bores 54 and 55, restrictors (not shown in detail) are arranged, which limit the oil volume flows conducted into the oil feed pocket 49 through the radial bores 54 and 55 respectively. In this way, unacceptably high pressure rises in the bearing gap 56 of the plain bearing 41 as a result of over-large oil volume flows, and undesirably high oil losses from the plain bearing gap 56 via the two axial end regions 41A, 41B of the plain bearing 41, are avoided.

Figure 6:
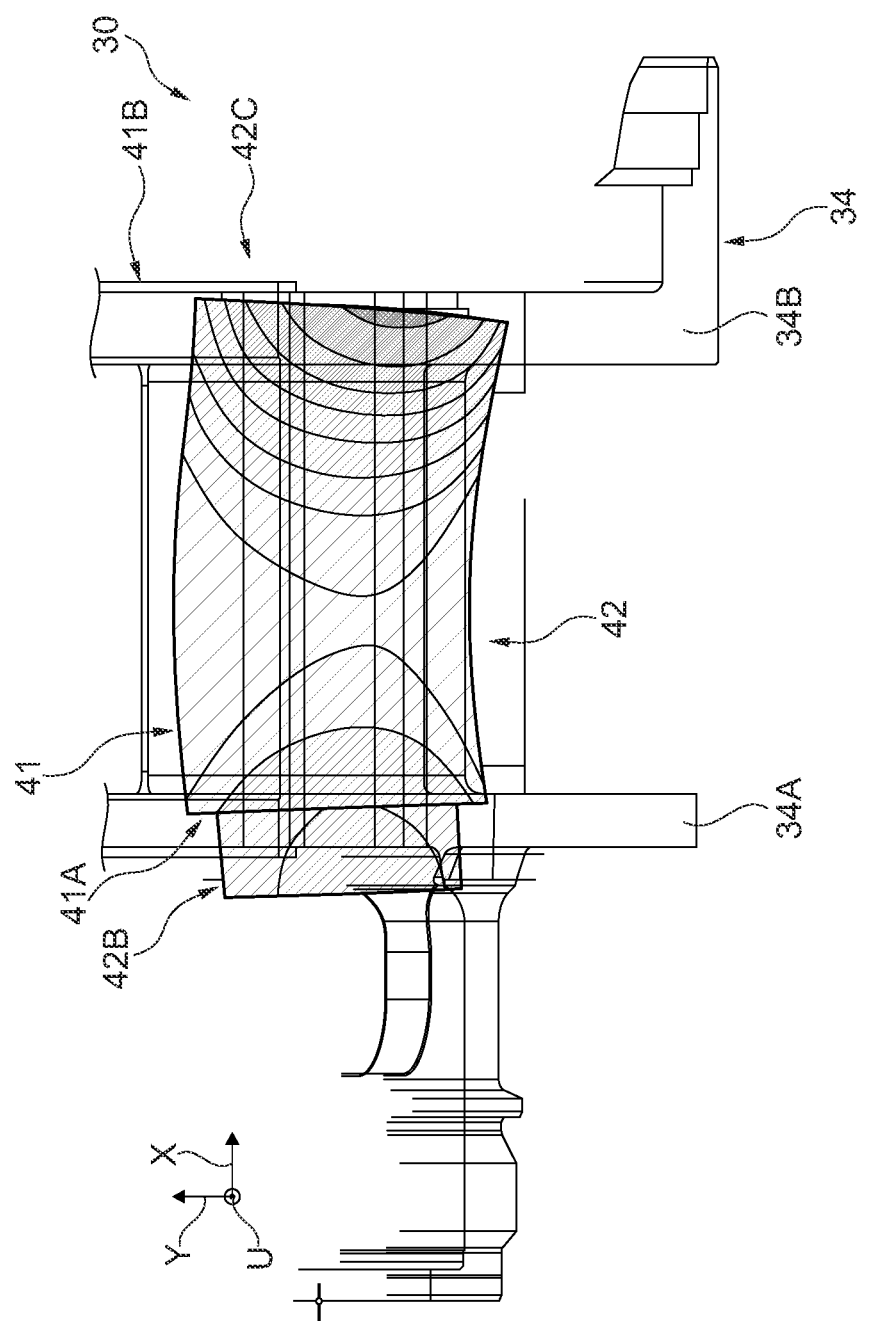
FIG. 6 shows a schematic sectional view of a planet pin of the planetary gear mechanism from FIG. 5 during operation of the planetary gear mechanism.

FIG. 6 shows a further schematic, partial sectional view of the planetary gear mechanism 30 from FIG. 5 under load.

From the illustration in FIG. 6, it is clear that, during operation of the gas turbine engine 10, while the planet carrier 34 rotates and correspondingly torque is conducted via the planetary gear mechanism 30, the planet pin 42 deforms in the radial direction Y between its two end regions 42B and 42C to the extent shown. The deformation of the planet pin 42 has a maximum at approximately an axial bearing centre of the plain bearing 41.

Figure 7:
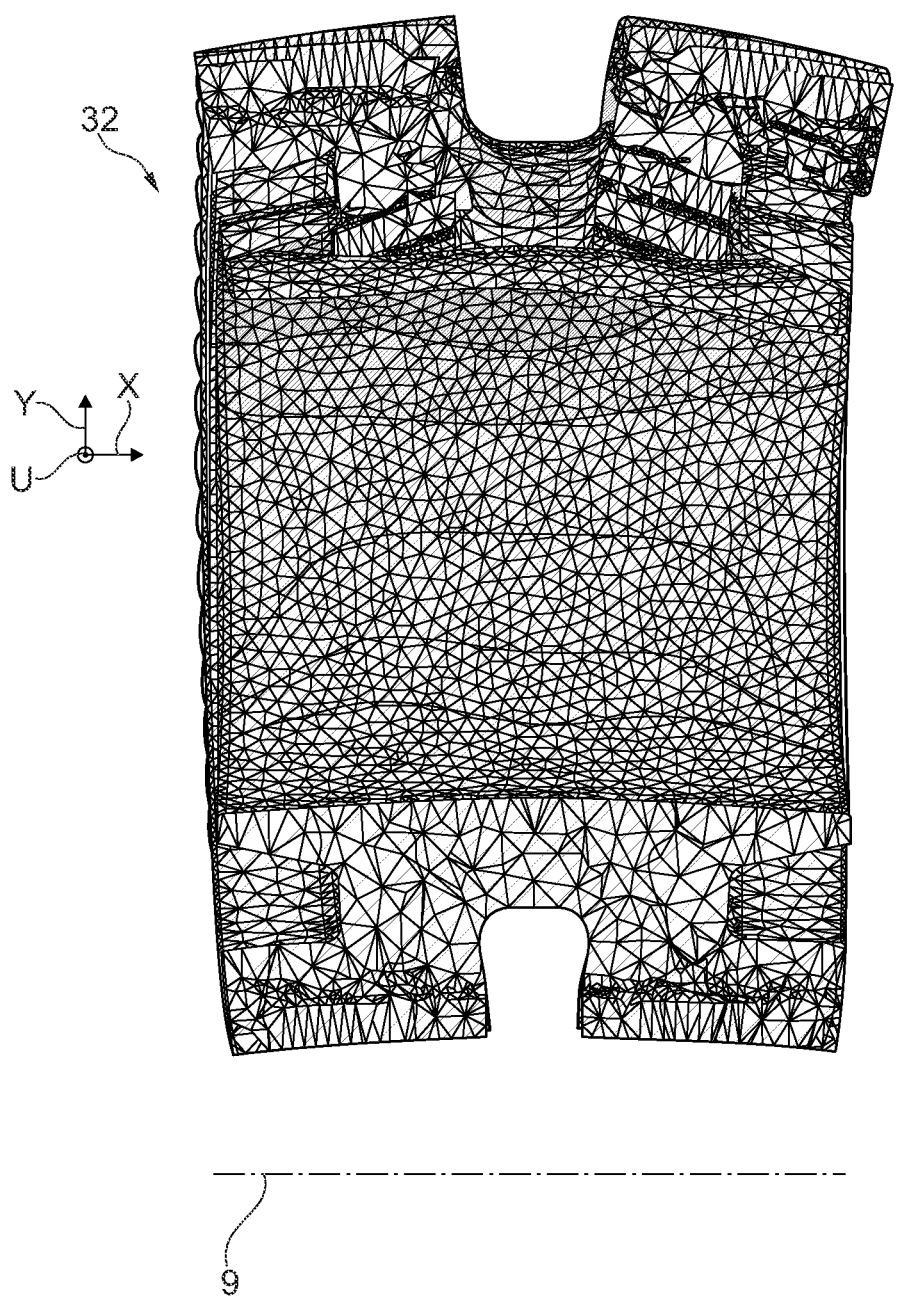
FIG. 7 shows the planet gear of the planetary gear mechanism from FIG. 5 under load, in an individual sectional view.

In addition, FIG. 7 shows the planet gear 32 alone, substantially during the load case on which the illustration in FIG. 6 is based. From the view in FIG. 7, it is clear that the planet gear 32, which has a double oblique toothing, is also deformed in the radial direction Y over the bearing width of the plain bearing 41.

Figure 8:
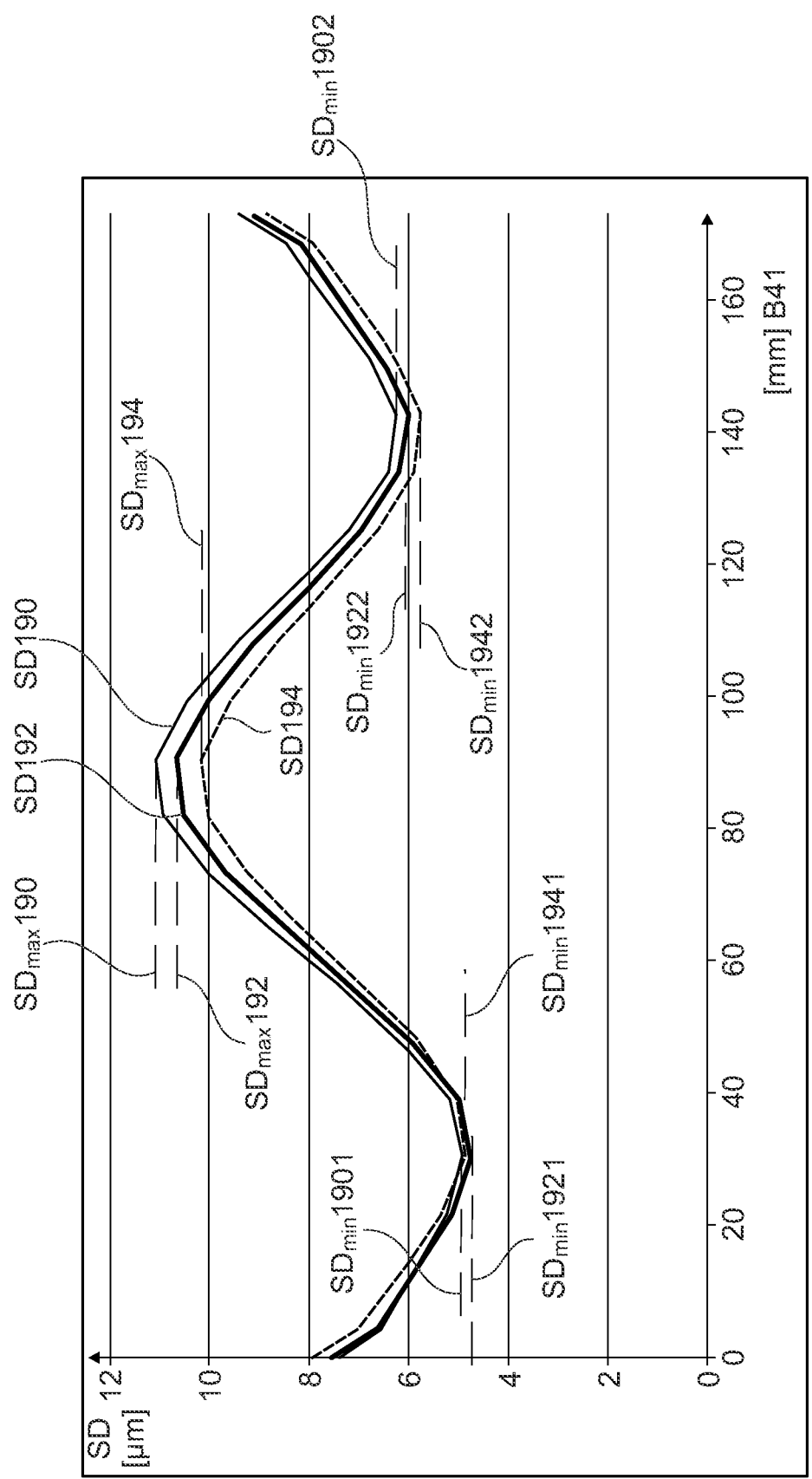
FIG. 8 shows several curves of a lubricant film thickness over the axial length of a plain bearing between a planet pin and a planet gear rotatably mounted thereon, of the planetary gear mechanism from FIG. 5, wherein the curves show the lubricant film thickness in different circumferential regions of plain bearing.

The deformation of the planet pin 42 shown in detail in FIG. 6, and the radial deformation of the planet gear 32 illustrated in FIG. 7, affect a bearing gap height or lubricant film thickness SD in the bearing gap 56 in both the axial direction X and in the circumferential direction U of the plain bearing 41. FIG. 8 shows three curves SD190, SD192 and SD194 of the lubricant film thickness SD in the bearing gap 56 of the plain bearing 41 over the bearing width B41 in three different circumferential regions of the plain bearing 41. The curve SD190 shows the lubricant film thickness SD in a circumferential angular range phi of around 190 degrees, starting from the top point 45 of the planet pin 42, in the rotational direction 44 of the planet gear 32. The curve SD192 shows the lubricant film thickness of the plain bearing 41 of the bearing width B41 in a circumferential angular range of around 192 degrees. In addition, curve SD194 shows the lubricant film thickness SD over the bearing width B41 in the circumferential angular range of around 194 degrees.

All three curves SD190, SD192 and SD194 of the lubricant film thickness SD initially fall, starting from the first axial end 42B of the planet pin or starting from the first end region 41A of the plain bearing 41, to a respective first minimum SDmin1901, SDmin1921, SDmin1941 present at a value of around 30 mm for the bearing width B41. Starting from the first minima SDmin1901, SDmin1921, SDmin1941 of the lubricant film thickness SD, the curves SD190 to SD194 each rise constantly to a maximum SDmax190, SDmax192, SDmax194, which for the curves SD190 to SD194 lies at a bearing width B41 of around 90 mm starting from the first axial bearing end 41A. Then the curves SD190 to SD194 of the lubricant film thickness SD each fall in the direction of a second minimum SDmin1902, SDmin1922, SDmin1942 which, for the load case concerned here, occurs at a bearing width B41 of around 140 mm. The lubricant film thicknesses SD190 to SD194 again rise constantly in the direction of the second axial bearing end 41B which faces the end region 42C of the planet pin 42.

Figure 9:
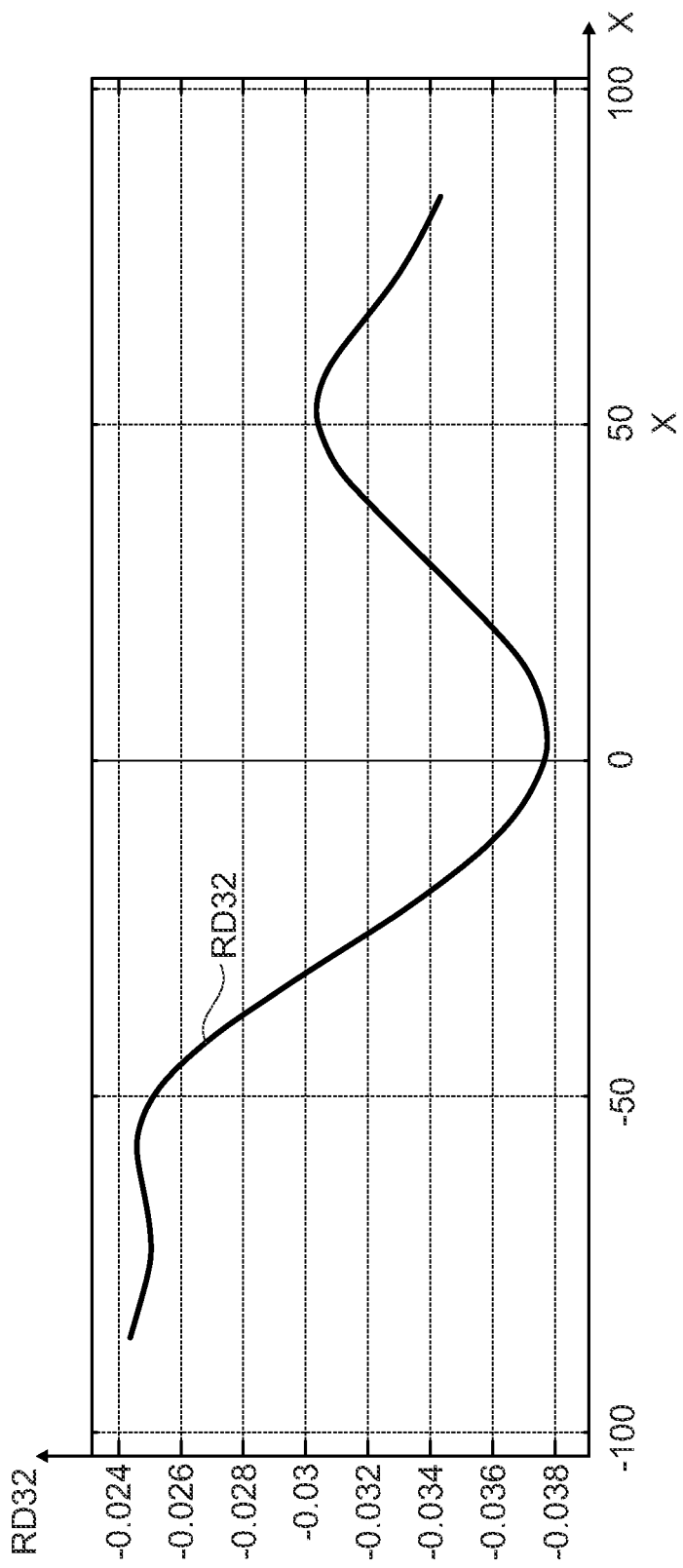
FIG. 9 shows a curve of a radial deformation of the planet gear from FIG. 7 over the axial width of the planet gear.

FIG. 9 shows a curve RD32 of the radial deflection of the planet gear 32 over the axial extent direction X of the planet gear 30 of the planetary gear mechanism 30 from FIG. 5. The curve RD32 shows the deformation behaviour of the planet gear 32 under load. It is clear from the curve RD32 that the planet gear 32 is deflected in the radial direction Y substantially less in the region of its axial sides than in the region of its axial centre.

FIG. 10 shows the planet pin 42 of the planetary gear mechanism 30 which has a sleeve 60 in the axial longitudinal bore 46 of the planet pin 42. The sleeve 60 is designed with the oil feed region 48 to the same extent as the sleeve 47, and its outer side 65 delimits the cavity 53 together with the inner side 52 of the planet pin 42. In contrast to the sleeve 47, the sleeve 60 according to FIG. 10 is connected by an outer side region 61, delimited in the axial direction X, to the inner side region 62 of the planet pin 42, which is also delimited in the axial direction X, via a press fit.

Figure 11:
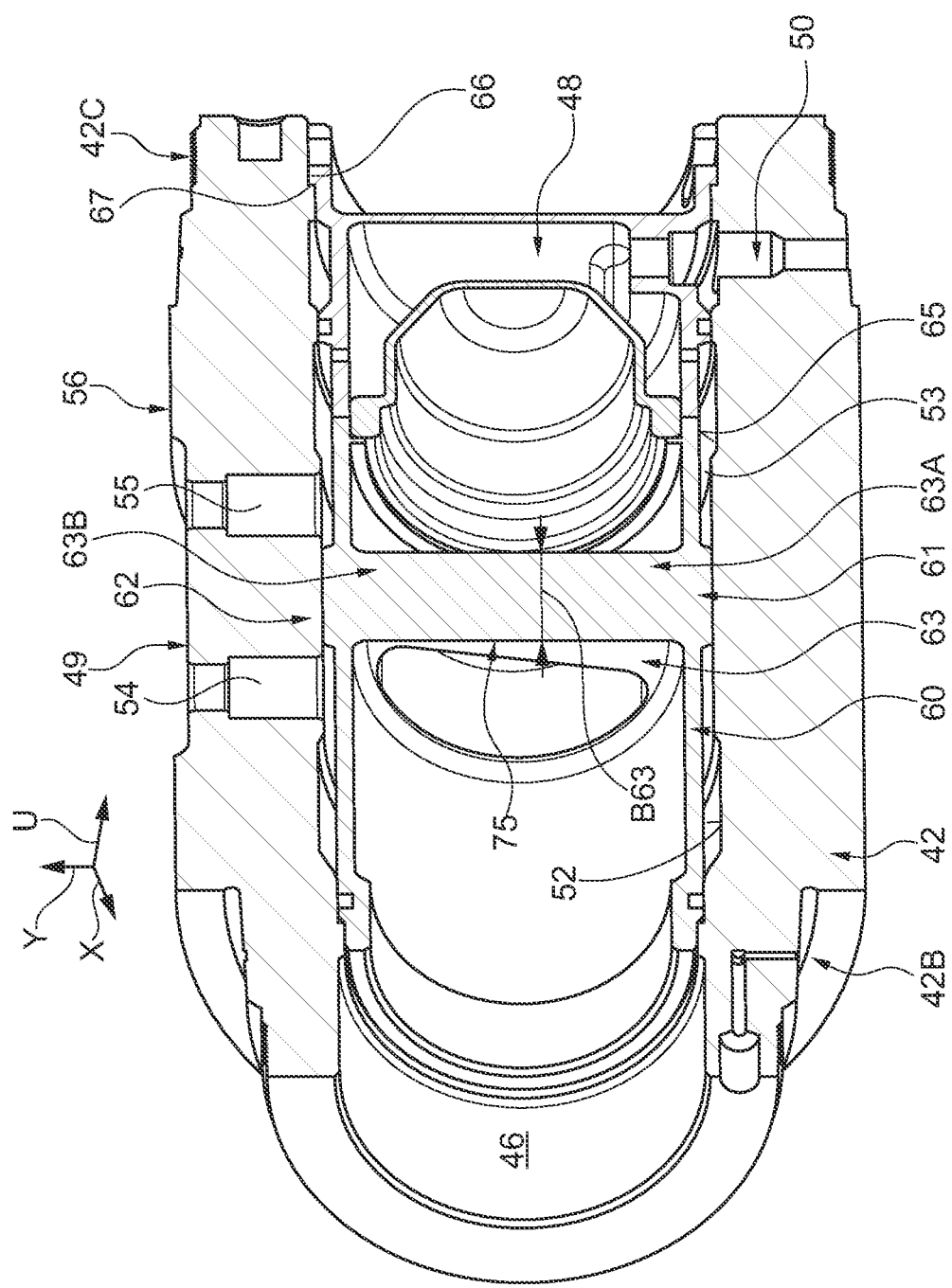
FIG. 11 shows a three-dimensional, longitudinal sectional view of the planet pin and the sleeve from FIG. 10.
Figure 12:
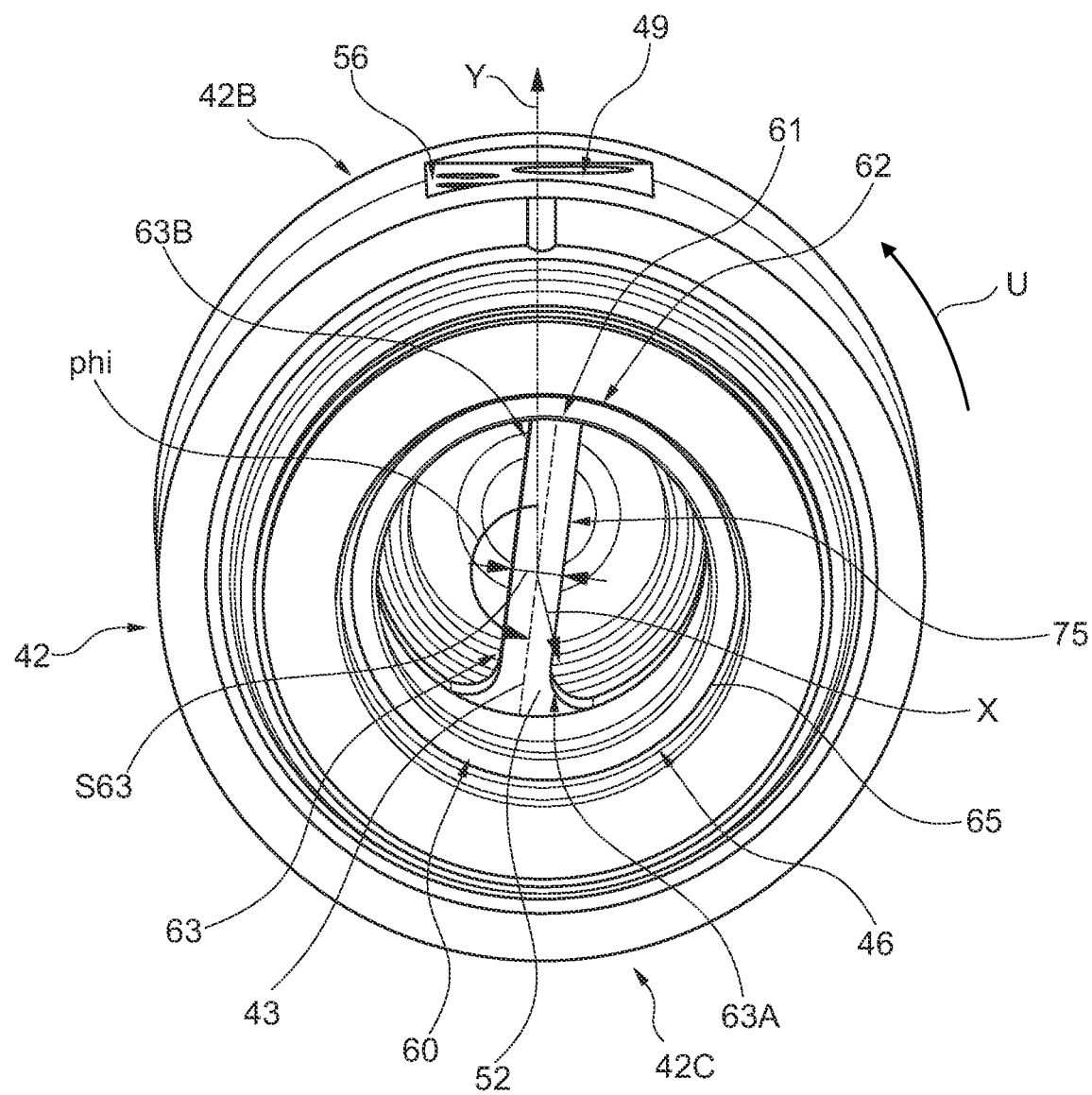
FIG. 12 shows the planet pin and the sleeve from FIG. 10 in a three-dimensional side view.

In addition, radially inside the outer side region 61, the sleeve 60 has a web 63 which extends radially through the hollow cylindrical sleeve 60 and is also shown in FIG. 11 and FIG. 12. Here, the web 63 is arranged in the inside of the planet pin 42 in the circumferential direction U and in the radial direction Y with an orientation such that, at one end, the sleeve 60 is fixedly connected in the region of the main load zone of the plain bearing 41 to an outer side region 61 of the sleeve 60, and at the other end is fixedly connected to the outer side region 61 on the opposite side of the outer side region 61 in the radial direction of the sleeve 60. The course of the web 63 encloses an angle phi with the radial direction Y which in the present case is around 170 degrees. At one end, the web 63 is connected on the circumferential side to the outer side region 61 of the sleeve 60 in the region of the main load zone of the plain bearing 41. Thus the radial stiffness of the planet pin 42 is increased by the sleeve 60, which is structurally stiffened in comparison with the sleeve 47, and the radial deflection RD42 of the planet pin 42 is reduced in comparison with the embodiment of the planetary gear mechanism 30 shown in FIG. 5.

A wall thickness S63 of the web 63 is constant in a middle region 75, which gives a desired high buckling resistance of the web 63. In addition, the wall thickness S63 of the web 63 increases constantly between the middle region 75 and the ends 63A, 63B of the web 63, which are each connected to the outer side region 61 of the sleeve 60, starting from the middle region 75 in the direction of the outer side region 61. In this way, harmonious transitions are achieved between the middle region 75 of the web 63 and the outer side region 61 of the sleeve 60, avoiding or limiting to acceptable values any undesired notch effects and resulting stress peaks in the connecting region between the ends 63A, 63B of the web 63 and the outer side region 61 of the sleeve 60. A width B63 of the web 63 is constant in the axial extent direction X of the planet pin 42 and the sleeve 60.

At its end, in the region of its outer side 65, the sleeve 60 lies on the inner side 52 of the planet pin 42, where it is preferably again fixedly connected to the planet pin 42 via suitable press fittings. In addition, an axial shoulder 66 of the outer side 65 of the sleeve 60 rests on an axial shoulder 67 of the inner side 52 of the planet pin 42, whereby an axial jointing path of the sleeve 60 relative to the planet pin 42 is limited in order to simplify mounting of the sleeve 60 with low structural complexity.

In addition, depending on the respective application case, the web 63 of the sleeve 60 is arranged between the two bearing ends 41A, 41B of the plain bearing 41 in the axial direction X, such that a radial deflection RD42 of the planet pin 42 is limited to the desired extent, and the development of the lubricant film thickness SD in the plain bearing gap 56 of the plain bearing 41 is as homogenous as possible over the bearing width B41 of the plain bearing 41. This makes a substantial contribution to improving the plain bearing properties and the service life of plain bearing 41.

Figure 13:
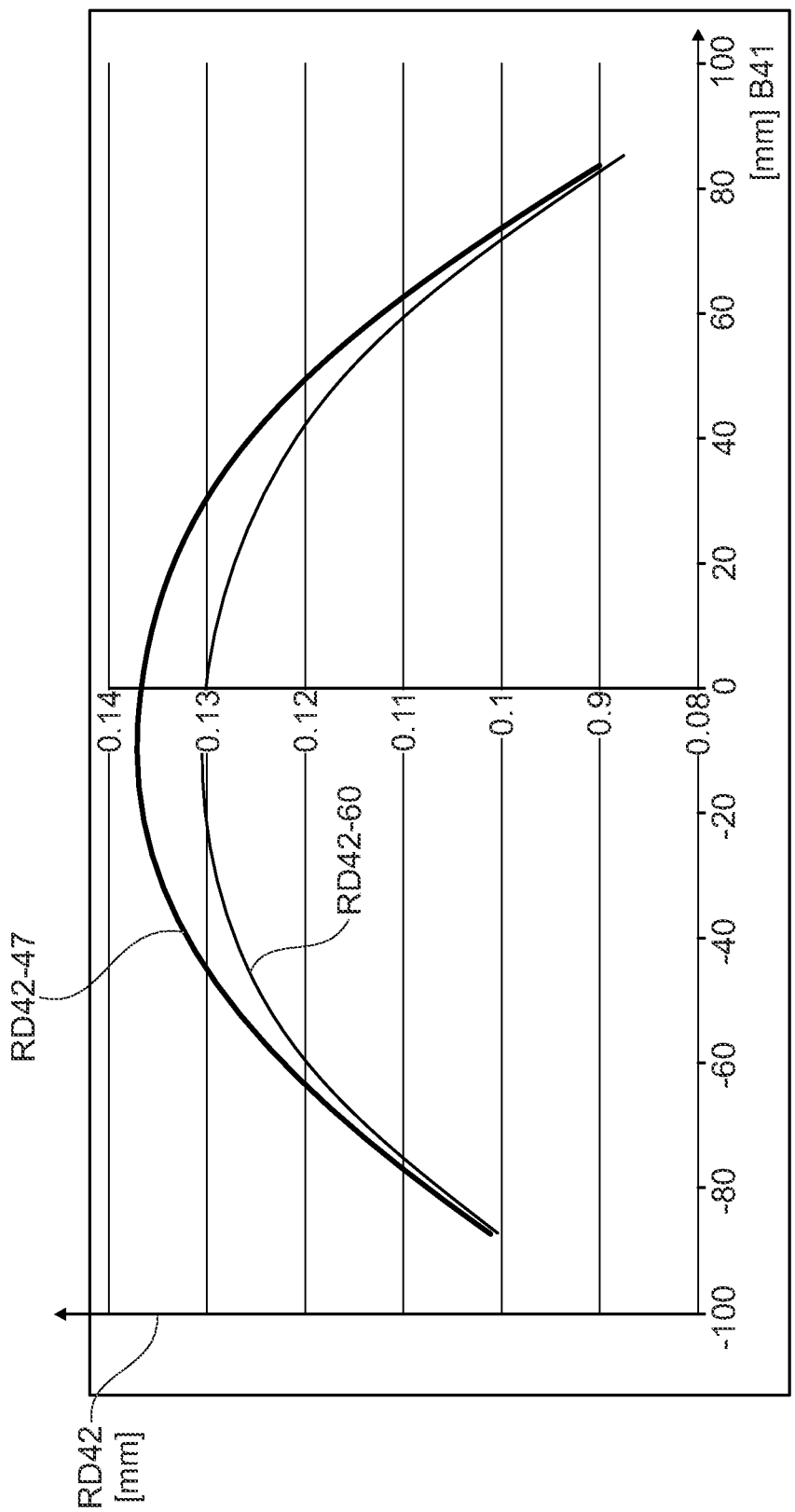
FIG. 13 shows a curve of a radial deflection of the planet pin of the planetary gear mechanism from FIG. 5, and a curve of the radial deflection of the planet pin containing the sleeve shown in more detail in FIG. 10, in each case over the axial width of the plain bearing.

FIG. 13 shows a curve RD42-47 of the radial deflection RD42 of the planet pin 42 over the bearing width B41 during operation of the planetary gear mechanism 30 from FIG. 5. As a comparison, FIG. 13 shows a curve RD42-60 of the radial deflection RD42 of the planet pin 42 which results over the bearing width B41 if the sleeve 60 is provided in the planet pin 42. Comparison of the two curves RD42-47 and RD42-60 shows that the planet pin 42 with the sleeve 60 is deformed substantially less towards the outside, in the radial direction Y, in the middle bearing region of the plain bearing 41 than is the case for the planet pin 42 with the sleeve 47.

In addition, FIG. 14 shows a curve SD47 of the lubricant film thickness SD in the bearing gap 56 of the plain bearing 41, in a region of the circumferential angle phi of around 180° over the bearing width B41, which results when the sleeve 47 is arranged in the planet pin 42. The curve SD60 of the lubricant film thickness SD in the plain bearing 41 is achieved, in operation of the planetary gear mechanism 30, over the bearing width B41 in a range of the circumferential angle phi of around 174° when the sleeve 60 is mounted in the planet pin 42.

Comparison of the two curves SD42 and SD60 shows that the curve SD60, starting from the left bearing edge 41A of the plain bearing 41 in the direction of the first minimum SD60min1, falls to a lesser extent than the curve SD47 in the direction of the minimum SD47min1. The maximum SD60max of the curve SD60 is smaller than the maximum SD47max of the curve SD47. The curves SD47 and SD60 have approximately the same values in the region of the second minima SD47min2 and SD60min2. Then the curve SD60 rises more strongly than the curve SD42 in the direction of the right bearing side 41B of the plain bearing 41. The lubricant film thickness SD of the curve SD60 has a value of around 10 μm in the region of the right bearing end 41B, which corresponds to the value of the maximum SD60max and also to the value of the lubricant film thickness SD in the region of the left bearing edge 41A. According to curve SD47, the lubricant film thickness SD has values of less than 9 μm at each of the right bearing edge 41B and the left bearing edge 41A. It can be concluded from this that the structurally stiffer sleeve 60 contributes substantially to evening out the height of the bearing gap 56 and also the lubricant film thickness SD.

FIG. 15 shows a curve p_SD47 of the oil pressure p_SD in the bearing gap 56 of the plain bearing 41 over the bearing width B41 for a circumferential angle phi of around 180° when the sleeve 47 is mounted in the planet pin 42. Furthermore, FIG. 15 shows a curve p_SD60 of the oil pressure p_SD in the bearing gap 56 of the plain bearing 41 for a circumferential angle phi equal to 174°, which is achieved in the planetary gear mechanism 30 when the sleeve 60 is pressed into the planet pin 42. Comparison of the two curves p_SD47 and p_SD60 shows that the curve p_SD60 of the oil pressure p_SD in the middle axial bearing region of the plain bearing 41 has a more even development than the curve p_SD47 of the oil pressure p_SD.

FIG. 16*a* shows a three-dimensional map of the oil pressure p_SD in the plain bearing 41 over the bearing width B41, and also over the circumferential angle phi, when the sleeve 47 is arranged in the planet pin 42. The illustration in FIG. 16*a* shows that the lubricant film pressure p_SD in the circumferential range from 0° to around 90°, and in the circumferential range from 210° to 360°, is substantially equal to 0, and in the circumferential region of the plain bearing 41 between 90° and 210°, rises with the steep gradient to the extent shown. In addition, the lubricant pressure p_SD has maxima and minima over the bearing width B41 and also in the circumferential direction U of the plain bearing 41. These maxima and minima of the lubricant film pressure p_SD47, however, adversely affect the oil supply to the plain bearing 41 and result from the insufficient radial stiffness of the planet pin 42 when this is provided with the structurally less stiff sleeve 47.

FIG. 16*b* shows an illustration corresponding to FIG. 16*a* of the map of the lubricant film pressure p_SD over the bearing width B41 and over the circumferential angle phi of the plain bearing 41 when the sleeve 60 is pressed into the planet pin 42, and the press fit between the outer side region 61 of the sleeve 60 and the inner side region 62 of the planet pin 42 has an oversize of 0.03 mm.

In addition, FIG. 16c shows the map of the lubricant film pressure p_SD over the bearing width B41 and over the circumferential angle phi of the plain bearing 41 when the sleeve 60 is pressed into the planet pin 42, and the press fit between the outer side region 61 of the sleeve 60 and the inner side region 62 of the planet pin 42 has an oversize of 0.1 mm.

Comparison of the two maps of the lubricant film pressure p_SD in FIG. 16B and in FIG. 16C shows that with an oversize of 0.1 mm, the development of the lubricant film thickness p_SD is substantially more homogenous than with an oversize of 0.03 mm. The more homogenous development has a positive effect on the oil supply to the plain bearing 41 over the entire bearing width B41, and hence on its service life.

FIG. 17 shows a further embodiment of the planetary gear mechanism 30 in which a further sleeve 70 is provided in the axial longitudinal bore 46 of the planet pin 42, wherein like the sleeve 60, said sleeve 70 structurally has a greater stiffness than the sleeve 47 and constitutes an alternative design of the sleeve 60. The sleeve 70 is configured with two webs 71, 72 which are arranged next to one another in the axial extent direction X of the sleeve 70 and are spaced apart from one another. The oil feed region 48 of the sleeve 70 is provided between the two webs 71 and 72 in the axial direction. Furthermore, in the region of the webs 71 and 72, on the circumference, the sleeve 70 is connected to the planet pin 42 via press fittings.

It will be understood that the present disclosure is not limited to the embodiments above-described and various modifications and improvements can be made without departing from the concepts described herein. Any of the features may be used separately or in combination with any other features, unless they are mutually exclusive, and the disclosure extends to and includes all combinations and subcombinations of one or more features which are described here.

LIST OF REFERENCE SIGNS

9 Main axis of rotation
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Transmission, planetary gear mechanism
32 Planet gear
34 Planet carrier
34A, 34B Cheeks
36 Linkage
38 Ring gear
40 Linkage
41 Plain bearing
41A, 41B Axial end regions of plain bearing
42 Planet pin
42A Outer diameter of planet pin
42B, 42C End regions of planet pin
43 Arrow, main load direction
44 Direction of rotation of the planet gear
45 Radially outer point of the planet pin
46 Axial longitudinal bore of planet pin
47 Sleeve
48 Oil feed region
49 Oil feed pocket
50 Radially inner bore
51 Outer side of sleeve 47
52 Inner side of planet pin
53 Ring gap
54 Radial bore
55 Radial bore
56 Bearing gap
60 Sleeve
61 Outer side region of sleeve 60
62 Inner side region of planet pin
63 Web of sleeve 60
63A, 63B Ends of web 63
65 Outer side of sleeve 60
66 Axial shoulder of sleeve 60
67 Axial shoulder of planet pin
70 Sleeve
71, 72 Web of sleeve 70
75 Middle region of web 63
A Core air flow
B Air flow
B41 Bearing width
B63 Width of web 63
FD Bearing force component
FF Bearing force component
phi Angle
p_SD Oil pressure
RD32 Radial deflection of planet gear
RD42 Radial deflection of planet pin
SD Lubricant film thickness
S63 Wall thickness of web 63
U Circumferential direction
Y Radial direction
X Axial direction

The invention claimed is:

1. A planetary gear mechanism with a planet carrier and at least one planet pin which is rotationally fixedly connected thereto and on which at least one planet gear is rotatably mounted via a plain bearing,
wherein the planet pin is configured to be at least approximately hollow cylindrical at least in regions, and a sleeve is provided in the planet pin which comprises an oil feed region through which the plain bearing is supplied with oil,
wherein an outer side region of the sleeve and an inner side region of the planet pin are connected together via a press fit,
and wherein the sleeve has at least one web which lies radially inside the outer side region, extends radially through the sleeve and is fixedly connected at one end to the outer side region in a region of a main load zone of the plain bearing, and is fixedly connected at the other end to the outer side region on an opposite side thereof in a radial direction of the sleeve.

2. The planetary gear mechanism according to claim 1, wherein a wall thickness of the web is constant in a middle region.

3. The planetary gear mechanism according to claim 2, wherein the wall thickness of the web rises constantly between the middle region and ends of the web, which are each connected to the outer side region, starting from the middle region in the direction of the outer side region.

4. The planetary gear mechanism according to claim 1, wherein a width of the web is constant in an axial extent direction of the planet pin and of the sleeve.

5. The planetary gear mechanism according to claim 1, wherein an outer side of the sleeve and an inner side of the planet pin delimit a cavity which is fluidically connected to the oil feed region of the sleeve and to an oil feed pocket of the plain bearing.

6. The planetary gear mechanism according to claim 5, wherein the planet pin comprises at least one bore which lies radially on an inside relative to the oil feed pocket, and via which oil is conducted radially through the planet pin into the oil feed region of the sleeve.

7. The planetary gear mechanism according to claim 5, wherein the planet pin comprises at least one bore which lies radially on an inside relative to the oil feed pocket, and via which oil is conducted from the cavity radially through the planet pin into the oil feed pocket of the plain bearing.

8. The planetary gear mechanism according to claim 7, wherein the planet pin has at least two radial bores which are arranged next to one another in an axial extent direction of the planet pin and are spaced apart from one another, wherein the web is positioned between the two radial bores in the axial extent direction.

9. The planetary gear mechanism according to claim 1, wherein the web is provided radially inside the oil feed pocket.

10. The planetary gear mechanism according to claim 1, wherein the sleeve has at least two webs which are arranged next to one another in an axial extent direction of the sleeve and are spaced apart from one another, wherein the oil feed region of the sleeve is provided between the two webs in the axial extent direction.

11. The planetary gear mechanism according to claim 1, wherein in the region of its outer side, ends of the sleeve rest on the inner side region of the planet pin.

12. The planetary gear mechanism according to claim 11, wherein an axial shoulder of the outer side of the sleeve rests on an axial shoulder of the inner side region of the planet pin.

* * * * *